UNITED STATES PATENT OFFICE.

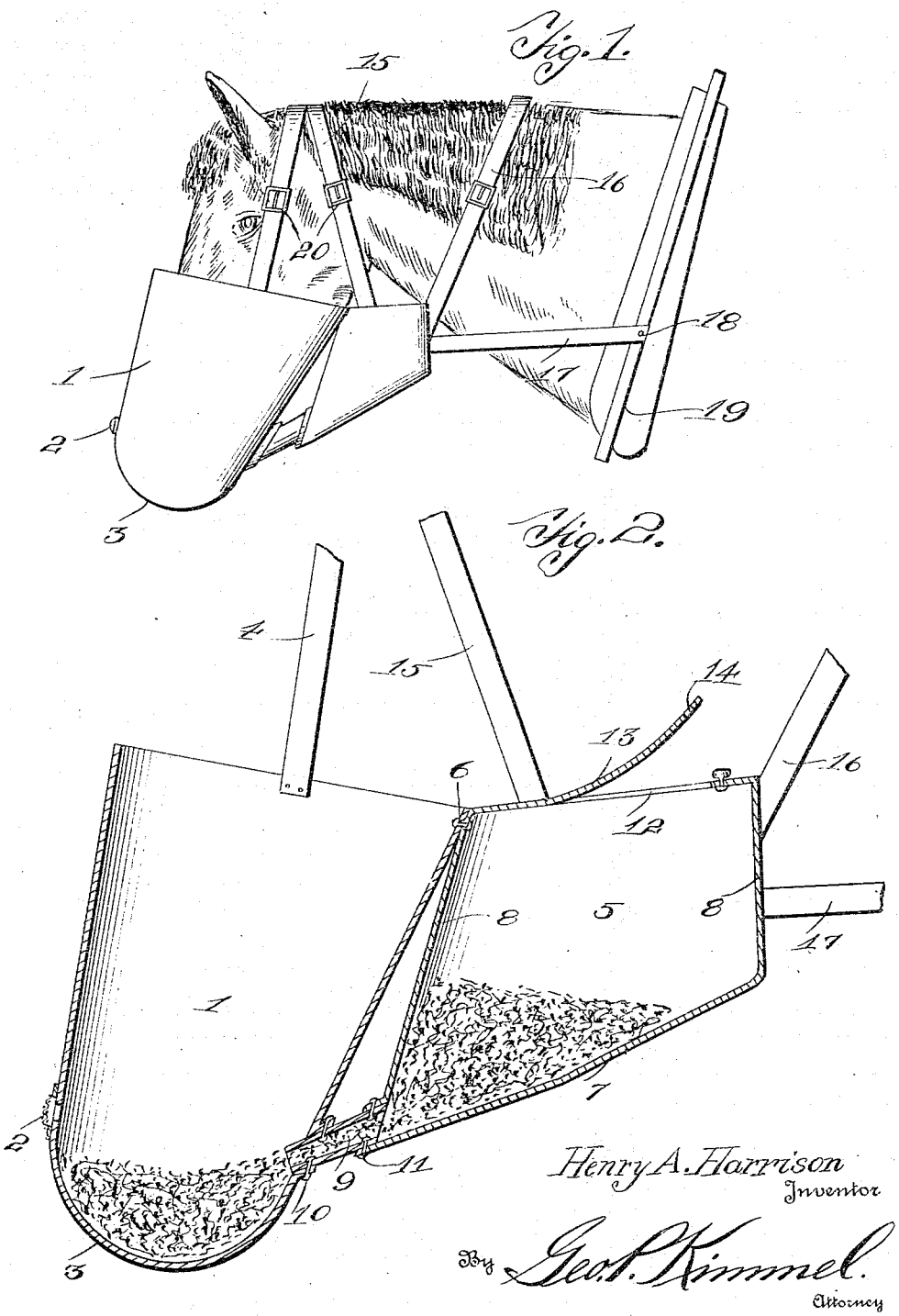

HENRY A. HARRISON, OF SYKESTON, NORTH DAKOTA.

FEED-BAG.

1,285,148.  Specification of Letters Patent.  Patented Nov. 19, 1918.

Application filed April 28, 1916. Serial No. 94,165.

*To all whom it may concern:*

Be it known that I, HENRY A. HARRISON, a citizen of the United States, and resident of Sykeston, in the county of Wells and State of North Dakota, have invented certain new and useful Improvements in Feed-Bags, of which the following is a specification.

The present invention relates to new and useful improvements in animal feeding devices and has particular reference to an improved type of feed bag, the primary object of the invention being to provide a feed bag having an auxiliary chamber associated therewith whereby to prevent more than a certain amount of feed being delivered to the main chamber at any single time, thereby preventing the animal from scattering the feed by shaking the bag.

Another object of my invention is to provide a feed bag of the class described having improved means for attaching the same to an animal's head and neck. My improved feed bag is also sanitary particularly in view of the foregoing from which it will be understood that the feed is contained in a closed chamber preventing the animal from wasting the feed.

Other objects and advantages to be derived from the use of my improved feed bag will appear from the following detail description and the claims, taken with an inspection of the accompanying drawing, in which:—

Figure 1 is a side elevation of a horse's head and neck and my improved feed bag showing the latter in position as in use; and Fig. 2 is a vertical sectional view through the feed bag, showing the interior arrangement of the feed containing chambers.

Referring more particularly to the drawings, wherein similar characters of reference designate like and corresponding parts throughout the various views, 1 designates the main chamber of my improved feed bag, the same being formed of a flexible material such as cloth or the like. An air inlet 2 is provided adjacent the lower end of the chamber 1, said lower end being closed by a bottom wall 3 of a hemi-spherical configuration. I do not lay any particular stress upon the material from which the improved feed bag is to be constructed but prefer to use leather or a similar strong and durable material.

The main chamber 1 of my improved feed bag is to be engaged over the nose of an animal, a horse's head being shown in the present instance. A strap 4 is connected to the upper edge of the bag chamber 1 and is adapted to be engaged over the horse's head just behind the ears.

The auxiliary section of my improved feed bag comprises a chamber 5 secured as at 6 to the chamber 1 and having a bottom 7 and side walls 8. An outlet is provided in the bottom of the chamber 5 comprising a pipe 9 secured as at 10 and 11 to the chamber 1 and the chamber 5 respectively, thereby affording communication between the chambers. It will be noted that the bottom 7 of the chamber 8 is inclined toward the chamber 1 thereby causing the contents of the chamber 5 to pass through said pipe 9 into said chamber 1. The top wall of the chamber 5 is provided with an inlet opening 12 closed by a flexible flap 13, said flap being adapted to be secured in closed position by fastening means 14 associated with the top of the chamber. The flap is shown partly open in Fig. 2.

The chamber 5 is formed of leather or the like similar to the chamber 1 and is suspended from the horse's head and neck by means of a plurality of straps 15, 16 and 17 the latter mentioned strap being secured at 18 to the collar 19 of the horse's harness. Buckles 20 serve to connect the straps 4, 15 and 16 when placed about the horse's head and neck.

In use it will be seen that the inclined bottom of the chamber 5 normally tends to deliver the contents of the chamber 5 to the chamber 1. Said contents will cease to flow when the chamber 1 becomes filled to the outlet portion of the pipe 9, and as the animal eats the food contained in the chamber 1 a continual flow is supplied from the chamber 5 until the contents of the latter is exhausted. It will thus be seen that in the provision of my improved feed bag the animal is prevented from wasting the feed by shaking the bag owing to the position of the auxiliary chamber 5 which only permits a predetermined amount of the feed to be delivered to the chamber 1 as hereinbefore set forth.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:

1. A feed bag comprising a main chamber, an auxiliary chamber secured at its top portion to the top portion of the main chamber and diverging downwardly therefrom, a passageway connecting the bottom portions of the chambers and serving as means of communication between the two, said auxiliary chamber having an inclined bottom for discharging the contents thereof into the main chamber, and means carried by the main chamber and the auxiliary chamber for supporting the feed bag upon the head and neck of a horse or other animal to which the device is applied.

2. A feed bag comprising a main chamber, an auxiliary chamber secured at its top portion to the top portion of the main chamber and diverging downwardly therefrom, a passageway connecting the bottom portions of the chambers and serving as means of communication between the two, said auxiliary chamber having an inclined bottom for discharging the contents thereof into the main chamber, said main chamber having its bottom portion sloping downwardly and disposed below the bottom portion of the auxiliary chamber, a cover for the auxiliary chamber, an air vent at the front portion of the main chamber above the feed therein, detachable fastening devices for supporting the main chamber and auxiliary chamber upon the head and neck of the animal, in rear of the ears, adjustably, and means for connecting the auxiliary chamber to the animal's collar.

3. A feed bag comprising a main chamber, an auxiliary chamber secured at its top portion to the top portion of the main chamber and diverging downwardly therefrom, a passageway connecting the bottom portions of the chambers and serving as means of communication between the two, said auxiliary chamber having an inclined bottom for discharging the contents thereof into the main chamber, said main chamber having its bottom portion sloping downwardly and disposed below the bottom portion of the auxiliary chamber, a cover for the auxiliary chamber, an air vent at the front portion of the main chamber above the feed therein, and detachable fastening devices for supporting the main chamber and auxiliary chamber upon the head and neck of the animal, in rear of the ears, adjustably.

4. A feed bag for horses and the like, comprising a main chamber having a hemispherical bottom portion, an auxiliary chamber in rear of the main chamber and connected to the latter adjacent to the upper edges of each, said chambers being formed of flexible material, said auxiliary chamber having a forwardly inclined bottom and an integral cover cut from the top portion thereof, securing means for said cover to hold the same closed and permitting the same to be flexed upwardly for filling said auxiliary chamber with feed, said auxiliary chamber and said main chamber having openings disposed in alinement on an incline, a discharge tube affording communication between the auxiliary chamber and the main chamber above the hemispherical portion of the latter from the inclined bottom of the auxiliary chamber and connected to both outwardly of the openings therein whereby to automatically feed a predetermined quantity of feed to the main chamber, and affording an attaching means for said chambers, and means for supporting the bag.

In testimony whereof, I affix my signature hereto.

HENRY A. HARRISON.

Copies of this patent may be obtained for five cents each, by addressing the "Commissioner of Patents Washington, D. C."